(12) United States Patent
Shibuya

(10) Patent No.: US 6,724,699 B2
(45) Date of Patent: Apr. 20, 2004

(54) OPTICAL HEAD, LAZER DIODE MODULE AND OPTICAL RECORDING-REPRODUCING APPARATUS

(75) Inventor: Giichi Shibuya, Tokyo (JP)

(73) Assignee: TDK Corporation, Tokyo (JP)

(*) Notice: Subject to any disclaimer, the term of this patent is extended or adjusted under 35 U.S.C. 154(b) by 530 days.

(21) Appl. No.: 09/799,568

(22) Filed: Mar. 7, 2001

(65) Prior Publication Data

US 2001/0033530 A1 Oct. 25, 2001

(30) Foreign Application Priority Data

Mar. 7, 2000 (JP) .................................. P. 2000-062123

(51) Int. Cl.[7] ................................................ G11B 7/00
(52) U.S. Cl. ................................ 369/44.37; 369/44.41; 369/112.05
(58) Field of Search ........................... 369/44.23, 44.37, 369/44.38, 44.41, 112.03, 112.05, 112.1, 112.15, 124.03

(56) References Cited

U.S. PATENT DOCUMENTS 5,325,353 A * 6/1994 Sasaki et al. ............ 369/275.2
5,727,009 A * 3/1998 Tajiri et al. ............... 369/44.14

FOREIGN PATENT DOCUMENTS

| JP | 11-296875 | 10/1999 |
| JP | 2000-82226 | 3/2000 |

* cited by examiner

Primary Examiner—Paul W. Huber
(74) Attorney, Agent, or Firm—Oblon, Spivak, McClelland, Maier & Neustadt, P.C.

(57) ABSTRACT

The spot diameter D3 of a side beam 21 imaged on a disc 5 is set to at least 2.5 times as large as that of a main beam. Via this configuration, an output signal from a detector detecting a reflected light via a side beam, that is, a signal representing a different in the output from photo-detection devices split by split lines in the radial contains a negligible track cross component caused by a beam spot crossing a track. The signal substantially contains a DC offset component alone caused by the shift of an objective lens in the radial direction under tracking control. Thus, by subtracting the output signal of the detector from the push-pull signal of the main beam, a tracking signal substantially containing no DC offset.

12 Claims, 7 Drawing Sheets

FIG.7A  FIG.7B
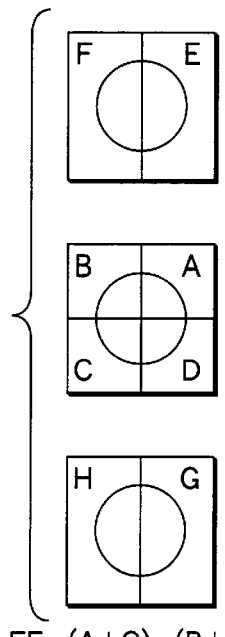
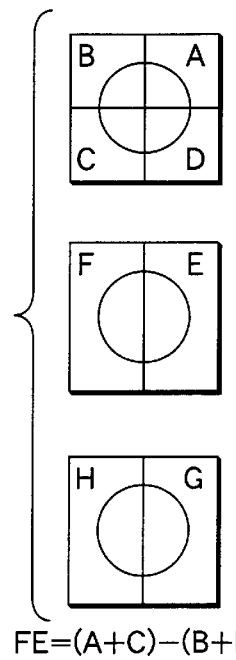
FE=(A+C)−(B+D)   FE=(A+C)−(B+D)
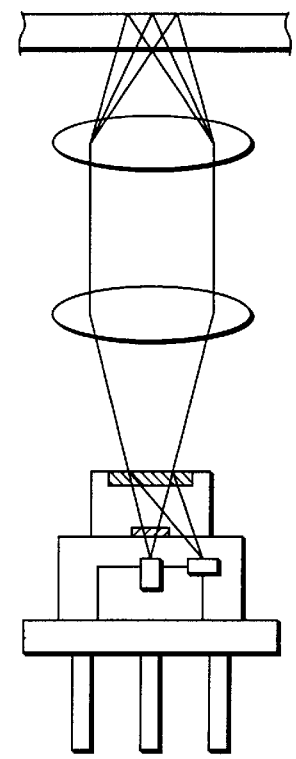
FIG.8
FIG.9A
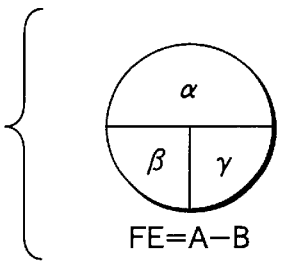
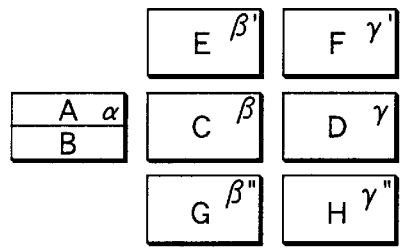
FE=A−B
FIG.9B
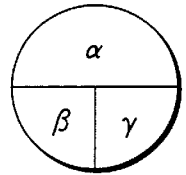
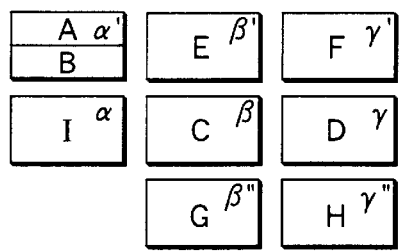
FE=A−B
RF=I+C+D
FIG.9C
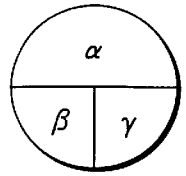
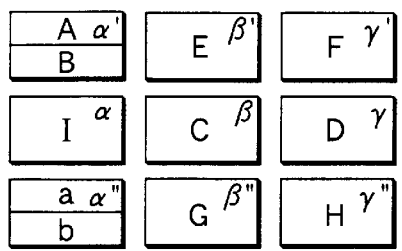
FE=A−B OR a−b
RF=I+C+D

OPTICAL HEAD, LAZER DIODE MODULE AND OPTICAL RECORDING-REPRODUCING APPARATUS

BACKGROUND OF THE INVENTION

The present invention relates to optical recording/reproducing apparatus and an optical head and an LD module used for the optical recording reproducing apparatus.

In the current situation where various types of optical discs are available on the market, optical recording/reproducing apparatus and an optical head that attain stable tracking of discs conforming to a plurality of specifications. Methods used in this case are roughly classified into: (1) a method where an RF signal is used to generate a tracking signal (hereinafter referred to as the TE signal), such as the phase difference detection method and the heterodyne method; (2) a method where a main beam is split into side beams for a TE signal on a disc, such as the 3-beam method and the differential push-pull method; and (3) a method that uses only a main beam without using an RF signal, such as the push-pull method. As shown in FIG. 4C, the push-pull method splits a detector 51 composed of a photo-detection device that receives a reflected light of a main beam spot into four devices by a split line in the track direction 51 and a split line in the radial direction. The push-pull method obtains a tracking signal TE=(A+D)−(B+C) via an arithmetic circuit 42 shown in FIG. 4D from output of each photo-detection device and uses the TE for tracking control, since TE=0 when a spot 50 is in the center of a track (pit) but TE>0 or TE<0 when the spot is deflected rightward or leftward.

Of these approaches, the method under (1) cannot be applied to media that require tracking servo for an unrecorded area, such as the CD-R and DVD-R. The method under (2) has a disadvantage that a track pitch cannot simultaneously support a plurality of discs, because it is necessary to align a side beam split from a main beam to the tracking direction as accurate as in micrometers and the optimum value of the interval depends on the track pitch of the disc. On the other hand, the push-pull method under (3) has advantages: first, the method does not depend on the presence/absence of an RF signal; secondly, it does not require accurate angle adjustment and high accuracy of position to the center of rotation of a disc; and thirdly, there are no restrictions on the difference of the track pitch between discs. Thus the push-pull method has been in widespread use since the optical disc was commercially introduced.

Systems for obtaining a focusing error signal for an optical head according to the related art includes the knife edge system, the Foucault system, the beam size system, and the astigmatism system. For an optical head where a light source and a photo-detection device are mounted individually, the knife edge system and the astigmatism system are generally used. On the other hand, for an LD module where a light source and a photo-detection device are mounted in the same package, the hologram Foucault system and the beam size system are generally used.

In the push-pull method, position and intensity of the spot 50 on the detector 51 composed of photo-detection devices may vary in case an objective lens is driven by a tracking coil and is moved in radial direction of a disc relative to another optical system, or in case a disc has a tilt from the optical axis. This causes direct offset signal in the generated TE signal (Tracking Error). This signal variation is called DC offset.

When tracking servo is applied with a DC offset component contained, the tracking performance is considerably degraded, causing a possible out-of-tracking error. Thus, the push-pull method is typically used with means for removing the DC offset.

As means for removing the DC offset according to the related art, a method is known where DC offset to accompany the eccentricity of a disc is estimated in advance, and after appropriate leaning, the offset amount is corrected in performing tracking servo. Another method according to the related art is known where tracking performance in the direction of the thread of an optical head is upgraded to minimized the lens shift. Another method according to the related art is known where a mirror area is provided on a disc and tracking servo is applied while correcting the offset in the mirror section.

These methods require complicated signal processing, mechanism section with good response characteristics, or specially formatted discs. Thus, methods under (1) and (2) with simpler configuration and less subject to influence by offset are more often found in actual applications.

On the other hand, in a focusing error signal according to the related art overlap signals (generated when a beam spot crosses a track (calledtrack cross signals) with the decentering of an optical disc, which appears as a disturbance to obstruct focusing servo. While overlapping of the track cross signals is a major problem in the astigmatism system, this cannot be completely avoided in the other systems. Conventionally, in order to reduce overlapping of track cross signals, a special diffraction grating for shifting some of the phase of a side beam was used as in the Japanese Patent Publication No. 11-296875/(1999), or a detector was split into more devices and special arithmetic operation processing was used to remove disturbance in the focusing error signal, as in the Japanese Patent Publication No. 2000-82262.

SUMMARY OF THE INVENTION

The invention, in view of the problems of the related art, aims at providing an optical head, an LD module, and optical recording/reproducing apparatus equipped with tracking control means that does not require complicated signal processing or position adjustment and can easily remove offset via a simple configuration.

An optical head according to the first aspect of the invention is an optical head provided in optical recording/reproducing apparatus, said optical head splitting a single laser beam emitted from a light source into a plurality of side beams via a diffraction element and radiating the plurality of side beams on a disc thus using the side beams for tracking control, characterized in that the spot diameter of a side beam imaged on a disc is set to at least 2.5 times as large as that of the main beam.

In this way, setting the spot diameter of the side beam at least 2.5 times as large as that of the main beam allows the spot of the side beam to be radiated in a wide range over several tracks on the disc in the radial direction. Thus, the reflected light caused by the side beam contains a negligible track cross component caused by a beam spot crossing a track (component caused by the difference in intensity between a track groove and a land). In other words, since the spot diameter of the side beam is increased, the cut-off frequency of the optical transfer parameter (OTP) is shifted in the lower frequencies. This removes a higher track cross component in the spatial frequency (reciprocal of the track pitch) and obtains a signal containing a DC offset component alone caused by lens shift. According to the invention, design is made so that the spatial frequency component corresponding to the track pitch may be removed via filtering effects, by enlarging the spot diameter of a side beam at least 2.5 times as large as that of the main beam.

When a difference in output signals from photo-detection devices is obtained by causing the reflected light of the side beam to enter a detector composed of the photo-detection devices split along a split line in the tracking direction, the difference contains almost no signals caused by the track cross component. However, the objective lens has shifted in the radial direction relative to another optical system such as a light source or a detector. This generates a difference in intensity of the reflected light corresponding to the shift on the split photo-detection devices, which difference displays the amount of the DC offset.

On the other hand, the spot diameter of the main beam is univocally determined by the track (bit) width and the reflected light caused by the main beam naturally contains a track cross component as well as a DC offset. A track cross signal containing such a DC offset is detected by the detector of the reflected light of the main beam.

Thus, by substantially subtracting a DC offset signal obtained from the detector of the reflected light of the side beam from a signal containing DC offsets obtained from the detector of the reflected light of the main beam, a TE signal where DC offsets are removed is obtained.

In the detection of a focusing error signal, using a side beam having a large spot diameter to carry out the arithmetic operation according to the related art can conveniently remove a track cross signal alone via the aforementioned filter effects, while leaving a signal component called a sigmoid signal necessary for focus servo. Another advantage of this approach is that detection systems of a focusing error signal are not particularly restricted as long as the spot diameter of a side beam satisfies the aforementioned conditions.

The side beam needs not to be a true circle bit it may be an ellipse. In case the width of the disc in the radial direction is at least 2.5 times as large as the spot diameter of the main beam, the amplitude of the track cross component after the arithmetic operation can be maintained at least 90 percent that of the track cross signal to be obtained.

The upper limit of the spot diameter of the side beam is restricted because the side beam must be in size not overlapping with the main beam on a disc. The upper limit is further restricted by the photo detection area of the detector of the side beam. Of these restrictions, the latter is more severe. One side of the detector is typically set to about 150 micrometers or below. In a design where the 10-fold magnitude is obtained between a disc and a photo-detector device in an optical head, the spot diameter of the side beam is reasonably set to 15 micrometers or below. On the other hand, the spot diameter of the main beam on a disc is about one micrometer thus the spot diameter of the side beam is desirably 15 times or below the spot diameter of the main beam.

An LD module according to the second aspect of the invention is an LD module according to the first aspect of the invention, characterized in that a hologram device designed to give aberration to beams other than a zero-order light is used in a diffraction device splitting a beam as means for enlarging the spot diameter of a side beam imaged on a disc to exceed that of a main beam.

In this way, obtaining a side beam with the spot diameter enlarged via a diffraction device splitting a main beam requires the same number of parts and the same scale as apparatus using the differential push-pull method according to the related art, without increasing the number of parts.

Optical recording/reproducing apparatus according to the third aspect of the invention comprises an optical head according to the first aspect of the invention or an LD module according to the second aspect of the invention, characterized in that detectors receiving disc-reflected lights of a main beam and side beams have split lines in the tracking direction of an image entering the detector and that said optical recording/reproducing apparatus performs arithmetic operation processing on output signals from photo-detection devices split by said split lines of each detector concerning the main beam and the side beams to obtain a tracking signal.

Obtaining tracking via such a method allows application of an arithmetic circuit having the same configuration as that of the differential push-pull method according to the related art as an arithmetic operation method. This configuration can be implemented easily.

Optical recording/reproducing apparatus according to the fourth aspect of the invention is optical recording/reproducing apparatus according to the third aspect of the invention, characterized in that said optical recording/reproducing apparatus removes a DC offset signal component of a tracking signal by subtracting a signal obtained from a side beam via the push-pull method from a tracking signal obtained from a main beam via the push-pull method.

Configuration according to the fourth aspect of the invention can be easily implemented, the same as the third aspect of the invention.

Further, it is possible to easily obtain a signal containing a negligible track cross component by using a sub-beam having a large size to detect a focusing error signal.

Furthermore, it is possible to provide an LD module that can generate a focusing error signal containing a negligible track cross component by arranging a detector where the sub-beam returns and carrying out arithmetic operation on the signal.

BRIEF DESCRIPTION OF THE DRAWINGS

FIG. 7A shows a detector splitting method according to the related art and an arithmetic operation method for detecting a focusing error signal via the astigmatism system;

FIG. 7B shows a detector splitting method according to the invention and an arithmetic operation method for detecting a focusing error signal via the astigmatism;

FIG. 8 shows a configuration of an LD module;

FIG. 9A shows a hologram device split pattern via an LD module according to the related art and arrangement of detectors;

FIG. 9B shows arrangement of detectors according to the invention; and

FIG. 9C shows an example where detectors split into two devices are provided for both side beams of the +1st order and the −1st order

DETAILED DESCRIPTION OF THE PREFERRED EMBODIMENTS

Figure 1:
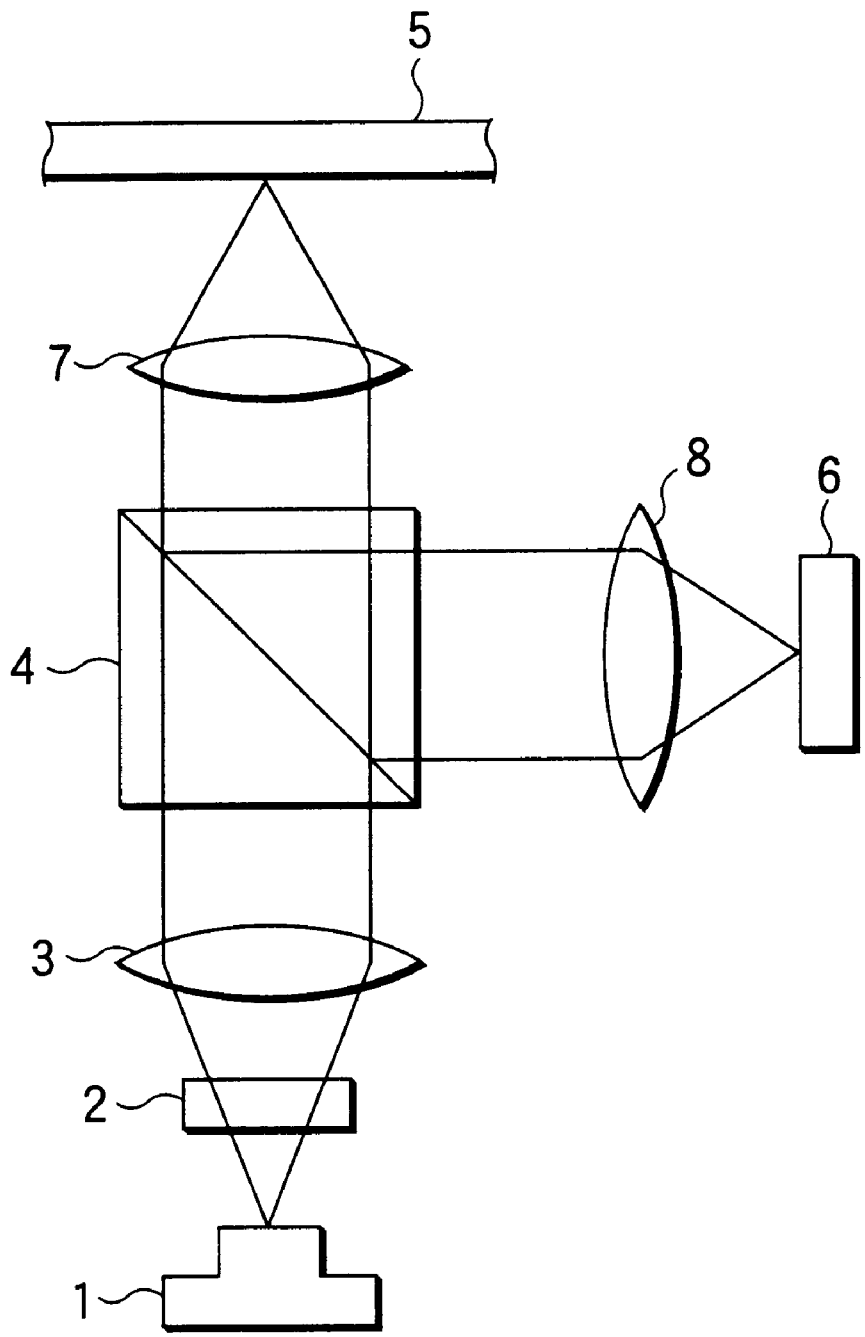
FIG. 1 is a block diagram showing an embodiment of an optical head according to the invention.

FIG. 1 is a block diagram showing an embodiment of an optical head according to the invention. In FIG. 1, shown are a light source 1 composed of a laser unit, a diffraction device 2 for splitting a laser beam from the light source 1, a collimator lens 3, and a beam splitter 4. The beam splitter 4 causes a light coming from the collimator lens 3 to pass onto an optical disc 5 and causes a reflected light from the optical disc 5 to reflect on a detector 6. Also shown are an objective lens 7 and an anamorphic (cylindrical) lens 8 to converge a reflected light from the beam splitter on the detector 6.

Figure 2A:
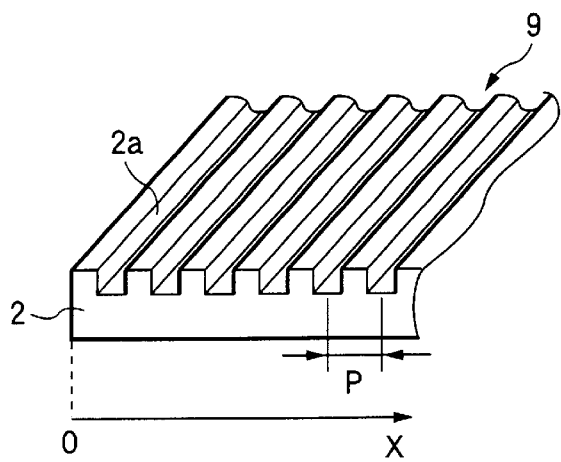
FIG. 2A is a perspective view explaining a diffraction device.
Figure 2B:
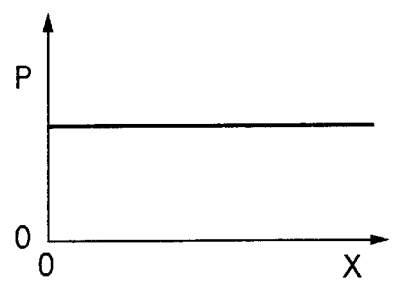
FIG. 2B is a graph explaining the groove pitch configuration of a general diffraction device.

FIGS. 2A to 2E explain the configuration of the diffraction device 2 used for the optical head. As shown in FIG. 2A, the diffraction device 2 forms a hologram device 9 by forming a plurality of grooves 2a on one face thereof. As shown in FIG. 2B, the pitch P of the grooves 2a on a general hologram device is constant along the direction of arrangement X of the grooves. In case the pitch P is constant, as shown in FIG. 3A, the diameter D1 of a spot of a main beam 13 via a zero-order light on the disc 5 (track grooves 11 and lands 12 are shown) is equal to the diameter D2 of a spot of a side beam 14 via a ±first-order light (D1=D2).

Figure 2C:
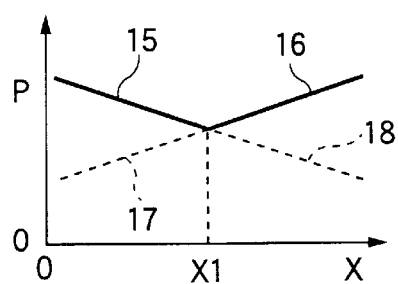
FIGS. 2C and 2D are graphs showing examples of the pitch configuration of a diffraction device used in the invention.
Figure 3A:
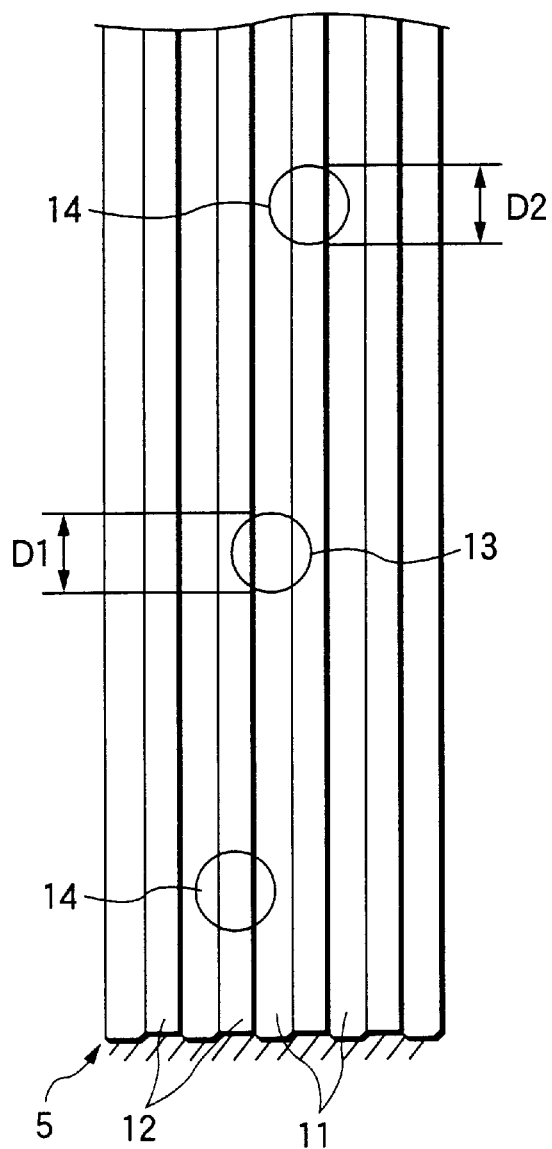
FIG. 3A explains the positions and the sizes of a main beam and a side beam on a disc in the differential push-pull method according to the related art.
Figure 3B:
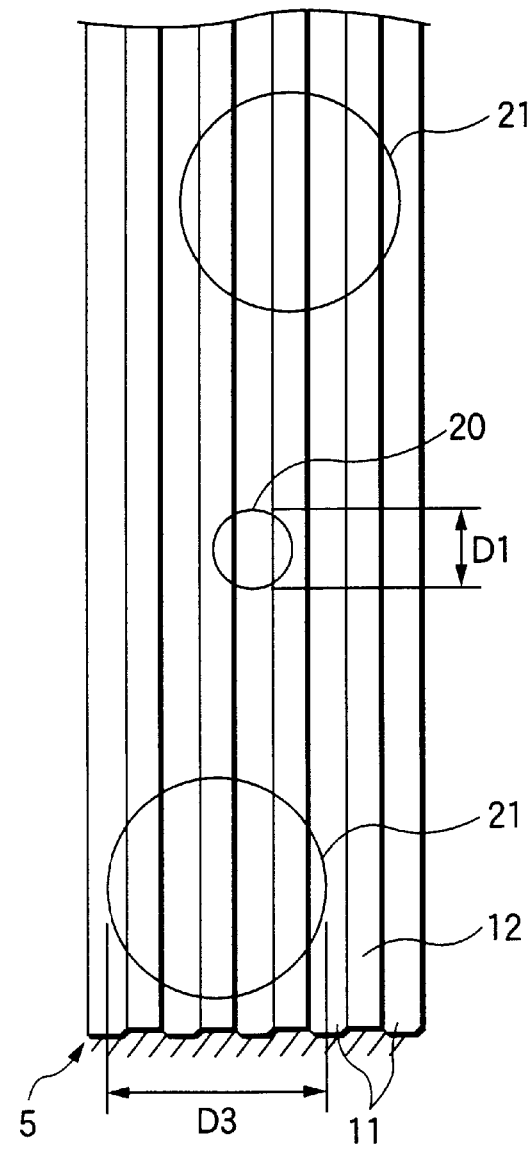
FIG. 3B explains the positions and the sizes of a main beam and a side beam on a disc according to the invention.

According to the invention, as shown in FIG. 2C for example, the pitch P gradually increases as the distance grows from the position x1 corresponding to the center of a beam radiated from the light source 1 as shown by solid lines 15, 16, or decreases as shown by broken lines 17, 18. Aberration is given to beams other than a zero-order light to provide the diameter D3 of a spot of a side beam 21 via a ±first-order light which is at least 2.5 times as large as the diameter D1 of a spot of a main beam 20 via a zero-order light (2.5×D1<=D3)

Figure 2D:
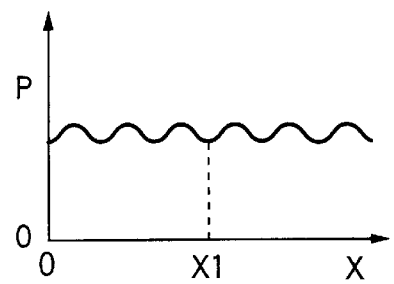
Figure 2E:
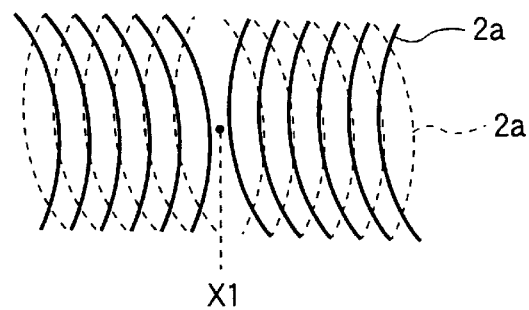
FIG. 2E is an example of the groove pattern showing the pitch configuration of a diffraction device used in the invention.

Another method for enlarging the diameter D3 of a spot of a side beam 21 is for example a method where the pitch P is cyclically varied as shown in FIG. 2D or a method where the grooves 2s are formed in curves.

Figure 4A:
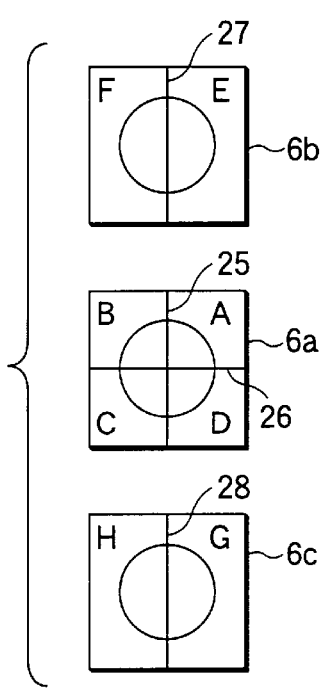
FIG. 4A shows an example of the configuration of a detector assumed when the invention is implemented.

FIG. 4A shows the configuration of the detector 6. A detector 6a is a detector for the reflected light of a main beam and composed of four photo-detection devices split by a split line 25 in the tracking direction of an image and a split line 26 in the radial direction of an image on the detector. Detectors 6b, 6c are detectors for the reflected light of a side beam and composed of two photo-detection devices split by split lines 27, 28 in the tracking direction.

Figure 4B:
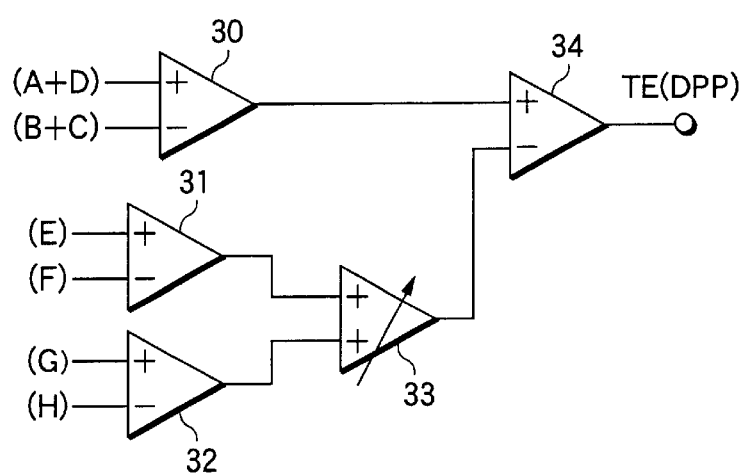
FIG. 4B shows an example of the configuration of an arithmetic circuit assumed when the invention is implemented.
Figure 4C:
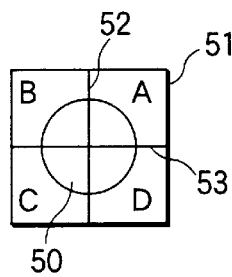
FIG. 4C shows an example of the configuration of a detector in the push-pull method according to the related art.
Figure 4D:
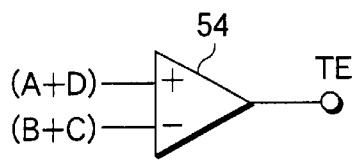
FIG. 4D shows an example of the configuration of an arithmetic circuit according to the related art.
Figure 5A:
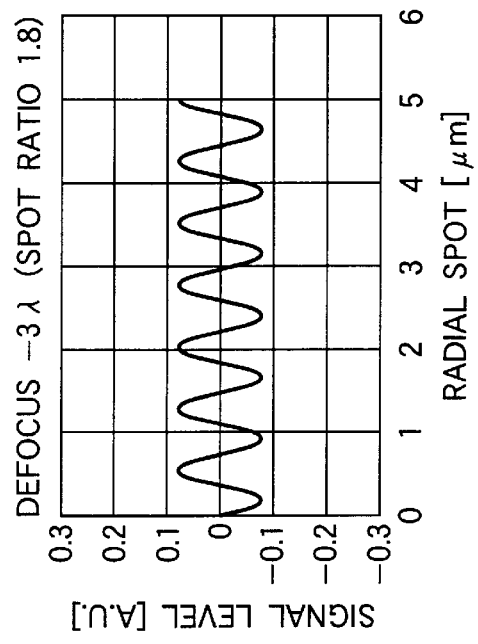
FIGS. 5A to 5D show the waveforms of a TE signal obtained by variously changing the spot diameter of a side beam on a disc against the spot diameter of a main beam and changing the position of an optical head in the radial direction of the disc.
Figure 5B:
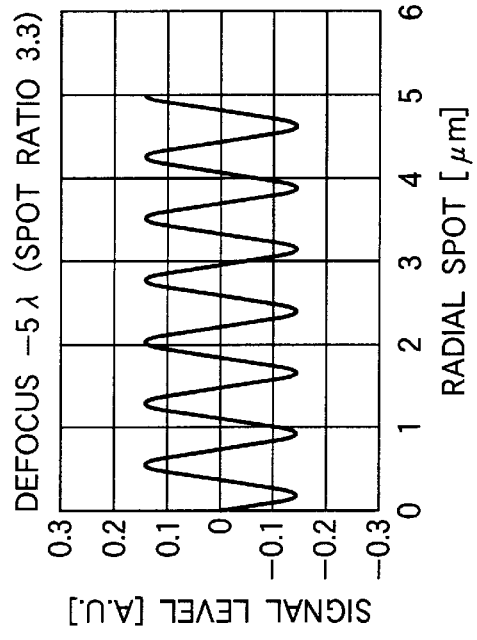
Figure 5C:
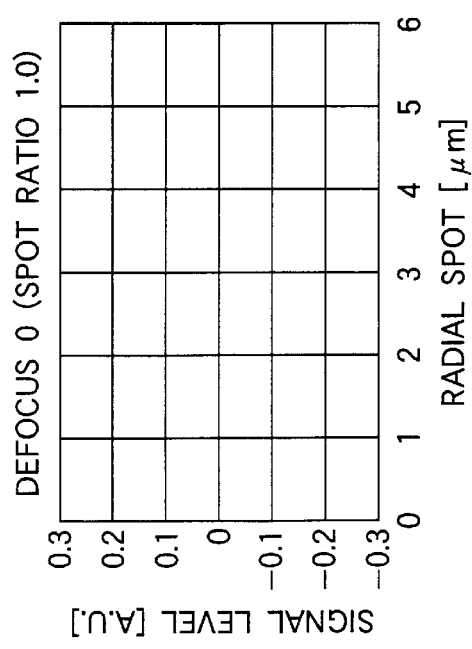
Figure 5D:
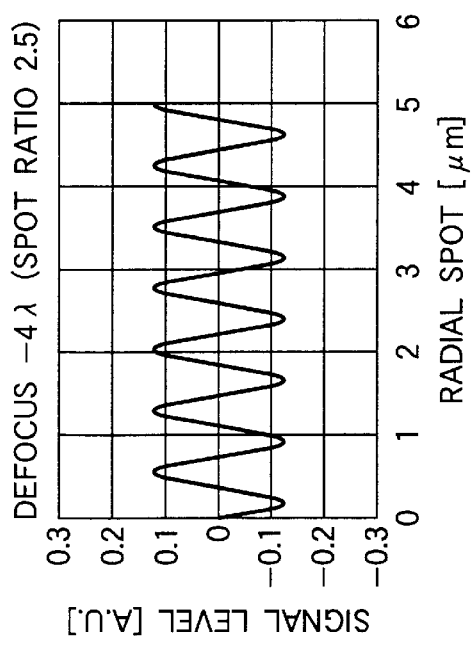

FIG. 4B is an arithmetic circuit that obtains a TE signal from the output signal of the detectors 6a through 6c. The arithmetic circuit is either installed on an optical head or in an area other than the optical head for processing a signal obtained by the detector 6 of the optical head. In FIG. 4B, an arithmetic circuit 30 performs arithmetic operation (A+D)−(B+C) from the outputs of split devices of the detector 6a for the reflected light of the main beam. Arithmetic circuits 31, 32 performs arithmetic operations (E−F) and (G−H) respectively from the outputs of the detectors 6a, 6c for the reflected light of the side beam. A circuit 33 obtains a proper value for removing a DC offset by summing up (E−F) and (G−H) from the outputs of the arithmetic circuits 31, 32 then by multiplying the resulting value by a factor α. An arithmetic circuit 34 obtains a TE signal by subtracting the output of the arithmetic circuit 33 from the output of the arithmetic circuit 30.

Thus, the output TS of the arithmetic circuit 34 is $$TE=(A+D)-(B+C)-\alpha\{(E-F)+(G-H)\}$$

The output of the arithmetic circuit 30 is a track cross signal containing a DC offset. A side beam spot is radiated over a plurality of track grooves 11 or lands 12, and each of the outputs of the arithmetic circuits 31, 32 is a difference between output signals from photo-detection devices split by split lines, the difference containing almost no signals containing the track cross component. However, the objective lens 7 has shifted in the radial direction relative to an optical system other than the objective lens 7 such as a light source 1 or a detector 6. This generates a difference in intensity of the reflected light caused by misalignment of the optical axis corresponding to the shift, in the outputs of split photo-detection devices of the detectors 6b, 6c, which difference displays the amount of the DC offset. Output of the arithmetic circuit 30 for processing the output of the detector 6a contains a DC offset as well as the track cross signal.

In the arithmetic circuit 33, the factor a is set so that the signal level of a DC offset contained in the output of the arithmetic circuit is equal to the signal level of a substantially DC offset as an output of the arithmetic circuit 30. Via such an arithmetic operation, a TE signal with a DC offset removed is obtained. The arithmetic circuit according to FIG. 4B may be configured the same as that of an arithmetic circuit using the differential push-pull method according to the prior art.

FIGS. 5A to 5D show the waveforms of a TE signal obtained by variously changing the spot diameter of a side beam on a disc against the spot diameter of a main beam and changing the position of an optical head in the radial direction of the disc, in case the wavelength of λ of a beam from the light source 1 is 650 nm. In FIGS. 5A to 5D, the factor α of the arithmetic circuit 33 in FIG. 4B is 0.5, the spot ratio is obtained by dividing the spot diameter of a side beam by the spot diameter of a main beam, and the spot ratios 1.0, 1.8, 2.5, 3.3 are obtained by generating defocusing of 0.3 λ, 4 λ, 5 λ respectively on the light source wavelength λ for a ±first-order light. In case the spot ratio is 2.5, the push-pull signal amplitude of a side beam is approximately 16 percent the amplitude of a main beam.

Figure 6:
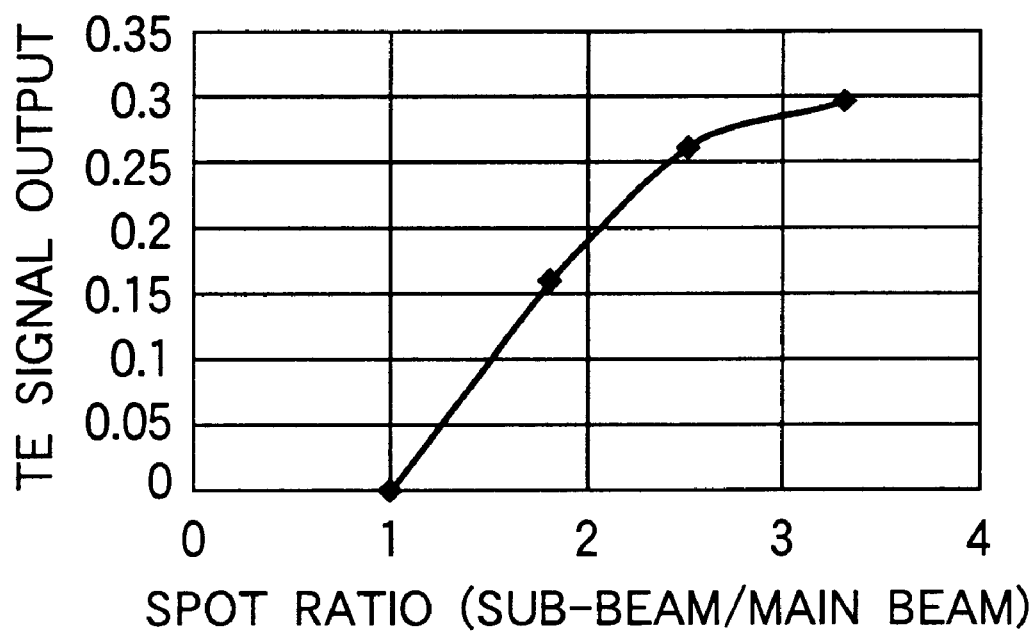
FIG. 6 shows variations in the output level of a TE signal obtained by variously changing the spot diameter of a side beam on a disc against the spot diameter of a main beam.

FIG. 6 shows signal levels obtained for the variety of spot ratios. As understood from FIGS. 5 and 6, the larger the spot ratio is, the larger TE signal is obtained. In order to keep the amplitude of a track cross component of a TE signal after the arithmetic operation, the ratio of the spot diameter must be equal to are greater than 2.5 times.

FIG. 7A shows a detector splitting method according to the related art and an arithmetic operation method for detecting a focusing error signal via the astigmatism system. FIG. 7B shows a detector splitting method according to the invention and an arithmetic operation method for detecting a focusing error signal via the astigmatism system. A detector for one of the side beams is split into four devices. The main beam and the other side beam use detectors split into two devices respectively in order to apply the aforementioned tracking signal detection system. All the detectors may be split into four devices and necessary signals may be generated and utilized as required, as in the embodiment described in the Japanese Patent Publication No. 2000-82226.

FIG. 8 shows a configuration of an LD module. FIG. 9A shows a hologram device split pattern via an LD module according to the related art and arrangement of detectors. Superscripts $\alpha$, $\beta$ and $\gamma$ show that beams bent by the areas of the hologram device strike against specified detectors. Presence/Absence of a prime ($\alpha$, $\alpha'$, $\alpha''$) show a return beam of the 0th order, ±1st order, or −1st order respectively (the latter two are interchangeable). FIG. 9B shows arrangement of detectors according to the invention. Hologram split pattern is the same as FIG. 9A. This configuration is characterized in that a detector split into two devices is provided where a side beam strikes and the corresponding arithmetic operation is used to obtain a focusing error signal. Detector I is provided to enhance the use efficiency of light employed as an RF signal. FIG. 9C shows an example where detectors split into two devices are provided for both side beams of the ±1st order and the −1st order. Detectors A, B and A', B' may be used at the same time or may be separately used as required.

In implementing the invention, contrast of a track or pit need not be detected at all. Accordingly, a side beam may be positioned any where on a disc wherein formation is stored. This means that the position of a side beam need not be adjusted in micrometers in the optical head and there is no need to consider the difference in the track pitch in the optical recording/reproducing apparatus, both of which are advantageous.

While two side beams are provided in the example, a single side beam may be used including those for the detectors. When two side beams are used, the detectors 6b, 6c may be respectively equipped with one photo-detection device alone.

The hologram device may be used standalone or may configure a module together with the detector 6. The types of aberration and hologram patterns are not restricted if the purpose of enlarging an imaging spot can be attained.

According to the first aspect of the invention, the spot diameter of the side beam is set at least 2.5 times as large as that of the main beam. This removes a DC offset easily via. a simple configuration, without requiring complicated signal processing and position adjustment.

According to the second aspect of the invention, a hologram device designed to give aberration to beams other than a zero-order light is used in a diffraction device splitting a beam as means for enlarging the spot diameter of a side beam imaged on a disc to exceed that of a main beam. This requires the same number of parts and the same scale as apparatus using the differential push-pull method according to the related art, without increasing the number of parts.

According to the third and fourth aspects of the invention, detectors receiving disc-reflected lights of a main beam and a side beam have split lines in the tracking direction of an image entering the detector and the optical recording/reproducing apparatus performs arithmetic operation processing on output signals split by said split line of each detector concerning the main beam and the side beam to obtain a tracking signal. Obtaining tracking via such a method allows application of an arithmetic circuit having the same configuration as that of the differential push-pull method according to the related art as an arithmetic operation method. This configuration can be implemented easily.

What is claimed is:

1. An optical head comprising:

a light source for radiating a single laser beam;

a diffraction element which splits said single laser beam into a plurality of sub-beams and radiates the plurality of sub-beams on a disc for tracking control;

wherein a diameter of said sub-beam on a disc is set to at least 2.5 times as large as that of the main beam.

2. The optical head as claimed in claim 1, further comprising a beam splitter, which causes a light coming from said light source to radiate onto the disk and causes a light reflecting from the disk to radiate to a detector.

3. The optical head as claimed in claim 1, wherein said diffraction element enlarges the diameter of said sub-beam on said disc.

4. The optical head as claimed in claim 3, wherein said diffraction element includes a hologram device designed to give aberration to beams other than a zero-order light.

5. An optical head according to claim 1, further comprising a detector for receiving a sub-beam reflected on a disc is split into at least four areas and producing a focusing error signal through arithmetic operation.

6. A laser diode module comprising:

a optical head including:
a light source for radiating a single laser beam; and
a diffraction element which splits said single laser beam into a plurality of sub-beams and radiates the plurality of sub-beams on a disc for tracking control;

wherein said diffraction element enlarges a diameter of said sub-beam on a disc to at least 2.5 times as large as that of the main beam.

7. A laser diode module as claimed in claim 6, wherein said diffraction element includes a hologram device designed to give aberration to beams other than a zero-order light.

8. A laser diode module according to claim 6, further comprising a detector for receiving a sub-beam reflected on a disc is split into at least two areas and producing a focusing error signal through arithmetic operation.

9. An Optical recording/reproducing apparatus comprising:

an optical head including a light source for radiating a single laser beam; and a diffraction element which splits said single laser beam into a plurality of sub-beams and radiates the plurality of sub-beams on a disc for tracking control, in that a diameter of said sub-beam on a disc is set to at least 2.5 times as large as that of the main beam, detectors which receive disc-reflected lights of a main beam and sub-beams respectively, each of said detector being split by split line in the tracking direction, wherein arithmetic operation processing on output signals from each detector split by said split line to obtain a tracking signal.

10. The optical recording/reproducing apparatus according to claim 9, wherein a DC offset signal component of a tracking signal is removed by subtracting a signal obtained from a side beam via the push-pull method from a tracking signal obtained from a main beam via the push-pull method.

11. An optical recording/reproducing apparatus according to claim 9, further comprising a detector for receiving a sub-beam reflected on a disc is split into at least four areas and producing a focusing error signal through arithmetic operation.

12. An optical recording/reproducing apparatus according to claim 6, further comprising a detector for receiving a sub-beam reflected on a disc is split into at least two areas and producing a focusing error signal through arithmetic operation.

* * * * *